2 Sheets—Sheet 1.

J. STROUD.

MEAT ROASTER.

No. 11,451. Reissued Oct. 30, 1894.

Witnesses
C. Severance
W. Harry Muzzy

Inventor
James Stroud
by Mason Fenwick & Lawrence
his
Attorney

2 Sheets—Sheet 2.

J. STROUD.

MEAT ROASTER.

No. 11,451. Reissued Oct. 30, 1894.

Witnesses

C. Severance.

W. Harry Munzy

Inventor

James Stroud by Mann Pennie & Severance his

Attorneys

UNITED STATES PATENT OFFICE.

JAMES STROUD, OF NEW YORK, N. Y.

MEAT-ROASTER.

SPECIFICATION forming part of Reissued Letters Patent No. 11,451, dated October 30, 1894.

Original No. 453,418, dated June 2, 1891. Application for reissue filed September 15, 1893. Serial No. 485,631.

*To all whom it may concern:*

Be it known that I, JAMES STROUD, a citizen of the United States, residing at No. 120 West Thirty-fifth street, in the city of New York, N. Y., have invented a new and useful Meat-Roaster, of which the following is a specification.

My invention relates to improvements in meat roasters, in which there is a combination of two vessels or pans, and the objects of my improvements are, first, to cook, brown and roast meat by the combination of steam and hot air; second, to obviate the necessity of basting and personal attention while attaining as good or a better result; third, to prevent burning the meat or juices, and, fourth, to preserve the juices of meat, and I attain these objects by means of two vessels or pans illustrated in the accompanying drawings, in which—

Figure 1:
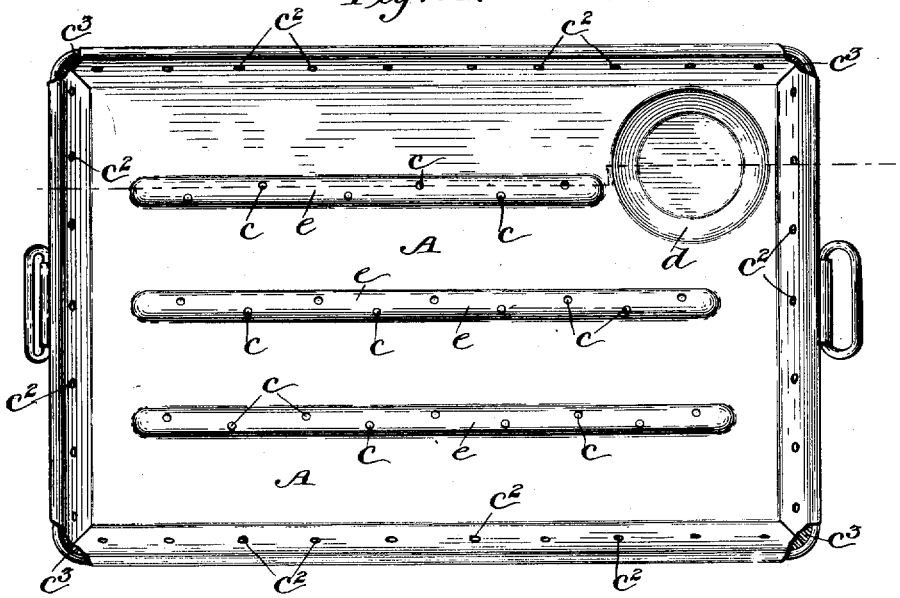
Figure 2:
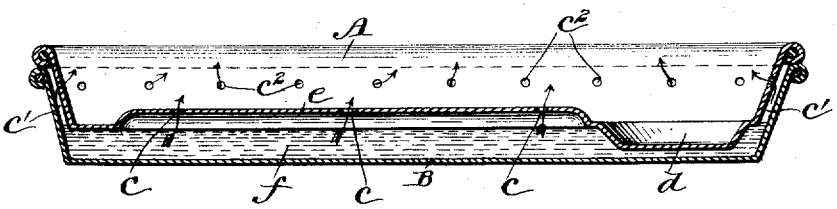
Figure 3:
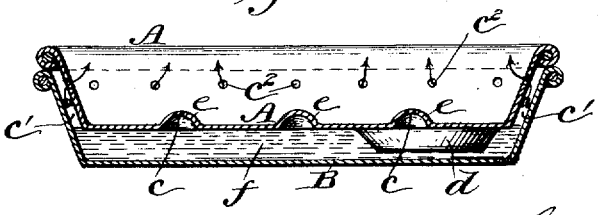
Figure 4:
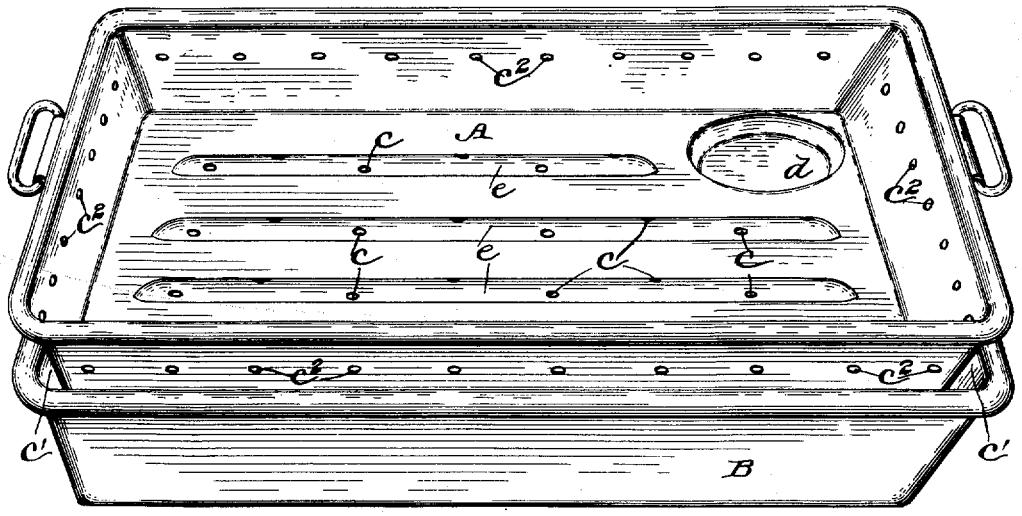

Figure 1 is a view of the upper vessel or pan. Fig. 2 is a longitudinal section through the two pans, and Fig. 3 is a transverse section of the same. Fig. 4 is a perspective view of my improved roasting pan, as it appears before being fully adjusted for use, the upper pan being shown slightly raised above the upper edge of the outer pan, and its body portion being slightly within the outer pan.

Similar letters refer to similar parts throughout the different views.

The upper vessel or pan A has a body portion of less depth and smaller diameter than the outer or lower vessel or pan B, and is provided with overlapping edges or flanges at its upper edge; and it rests within and upon the lower vessel or pan B; and by means of its overlapping edges resting upon the upper edges of the pan B, a space $f$ is formed between the inner surface of the lower vessel or pan, and the outer surface of the body portion and bottom of the upper vessel or pan. Upon the upper surface of the bottom of the upper vessel or pan, ridges $e$ are provided for the meat to rest upon, and through the inner or upper pan, spaces or orifices, as $c$, $c^2$, are provided to allow for the passage of the steam to the meat from between the pans, during the process of cooking; and at some point in the surface of the bottom of the upper vessel, there is a depression $d$ to allow for the collection of the juices or gravy. The vessels or pans are so shaped, and relatively proportioned in size, that a steam circulating space $c'$ is formed between them when the upper or inner pan is supported upon and within the outer pan, such space being a continuation of the space $f$. The steam exit spaces may occur between the two vessels or pans at any point along the sides thereof; also through the sides and tops of the raised ridges $e$; said spaces or orifice allowing of the passage to the meat of steam generated from the water in the space $f$. The ridges $e$ on the bottom of the inner pan do not extend to the upright ends of the pan, and therefore spaces are left between the ends of the ridges and the ends of the pan. Said ridges are so located, longitudinally of the pan, that spaces are formed between the sides of the pan and the two outer ridges of the series, and thus while valleys are formed between the ridges for the passage of the gravy to the receptacle $d$, the gravy has freedom to flow along the spaces outside of the ridges to said receptacle. The ridges $e$, and the depressed portion $d$ of the pan, are formed of material which is integral with the bottom of the pan as plainly shown in the drawings.

In Fig. 1, the corners of the inner or upper pan A are shown broken away, as at $c^3$, to exhibit the steam circulating space $c'$ between the walls of the pans.

In use, the space $f$ is filled to about half its depth with water. The meat is placed upon the ridges $e$, $e$, $e$. The upper vessel or pan A is placed within the lower vessel or pan as in Fig. 2. The vessels or pans are then placed in the stove, oven or other heating apparatus. The water in the space $f$ boils, generating steam. The steam passes to the meat through the openings or orifices in the body of the pan A as above described. The meat is cooked by the combination of hot air from the heating apparatus and the steam. By this means the meat is cooked, roasted and browned without personal attention after putting it in place, as above described, and without burning, and with a result as good or better than that accomplished by the ordinary basting, and the juices are saved. The juices flowing from the meat collect in the depression $d$ and serve for facilitating basting, if desired.

I am aware that gridirons have heretofore been made with corrugations upon which to place the meat, and also with receptacles for juices, and therefore I do not claim the same broadly; but What I do claim as my invention, and desire to secure by Letters Patent, is—

1. The combination with the pan B, of the pan A provided with overlapping edges and with the ridges *e*, *e*, in its bottom, orifices in said ridges and orifices $c^2$, $c^2$, $c^2$, in its side wall below its overlapping edge, the pan A being supported by and within the pan B so as to leave a water and steam space between the bottoms of the said pans, substantially as and for the purpose set forth.

2. The improved article of manufacture, to wit, a meat roaster, baster and gravy collector, consisting of two pans A and B, each having an open top, and the inner one a body portion of relatively smaller diameter than the outer one, and the inner one constructed with overlapping edges, and extending from its overlapping edges into the outer pan, and also provided with ridges *e* in its bottom, and also with orifices through it for conducting steam to its interior, said inner pan being supported by and within the pan B so as to have a water and steam space between the two pans, substantially as set forth.

3. The improved article of manufacture, to wit, a meat roaster, baster and gravy collector, consisting of two pans A and B, both open at top, and with their edges on about the same plane, and the body portion of one being of relatively smaller diameter than the other, and the inner pan provided with overlapping edges and extending down from its overlapping edges into the outer pan B, and having ridges in its bottom, a depression *d* at one end of the ridges and below the surface of the bottom for receiving the drip or gravy from the outside and between the ridges, said inner pan also having steam orifices leading to its interior, below its point of support, and being supported by and within the pan B so as to form a steam and water space between said pans, substantially as described.

4. The improved article of manufacture, to wit, a meat roaster, baster and gravy collector consisting of the pan A having an open top and an overlapping edge, and provided with ridges in its bottom, a depression near one end of the ridges and below the surface of the bottom adapted to receive the drip or gravy from the outside and between the ridges, and provided with steam orifices leading to its interior for conducting steam to meat at points below the top of the pan, said pan being adapted for use with an outer pan B by extending into and resting upon the outer pan so as to form a water and steam space between the two pans, substantially as set forth.

5. The improved new article of manufacture, to wit, a roaster and baster consisting of two pans with body portions of relatively larger and smaller diameters, both open at top, and with their upper edges on about the same plane; the inner pan being provided with an overlapping edge and its body portion extending a suitable distance into the outer pan, and the two pans having a water and steam space between them, and the inner pan provided with orifices leading to its interior below its upper edge, and supported by and within the pan by having its overlapping edge rest upon the upper edge of the pan B, substantially as described.

In testimony whereof I affix my signature in the presence of two witnesses.

JAMES STROUD.

Witnesses:
WILLIAM H. LE SEUR,
F. S. NORMAN.